W. C. THAIRLWALL.
Car Brake and Starter.
No. 201,720. Patented March 26, 1878.
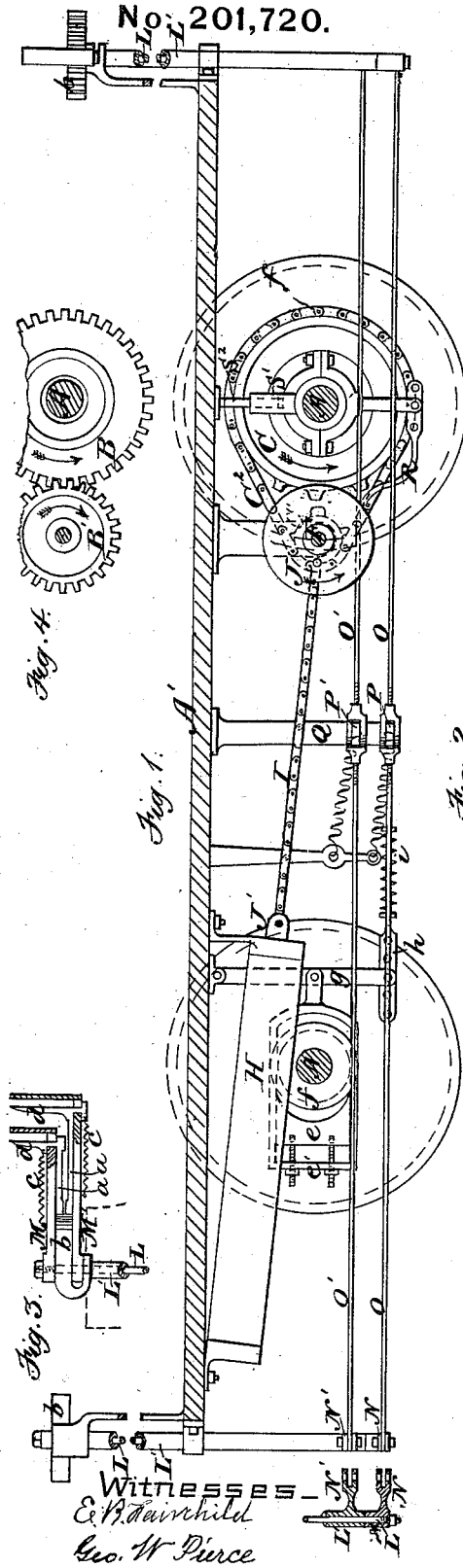
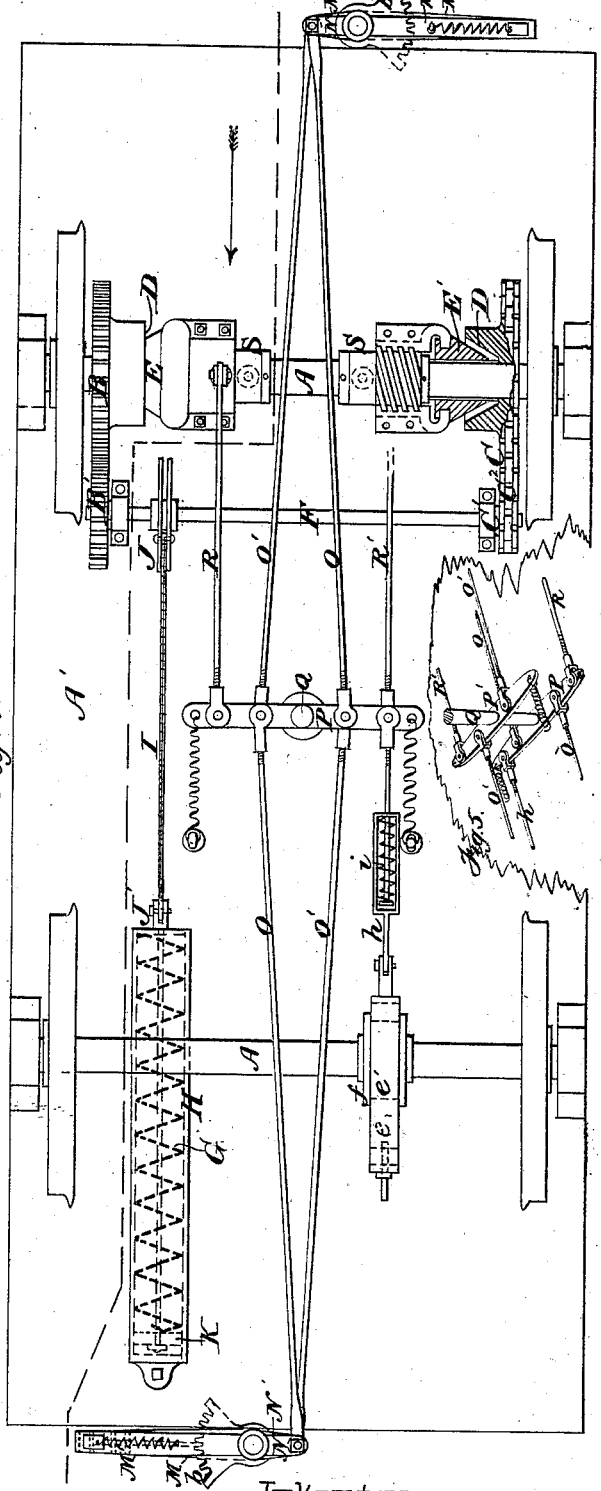
Witnesses
E. B. Fairchild
Geo. W. Pierce
Inventor
W. C. Thairlwall
by Wright & Brown
Attys.
N. PETERS, PHOTO-LITHOGRAPHER, WASHINGTON, D. C.

W. C. THAIRLWALL.
Car Brake and Starter.
No. 201,720. Patented March 26, 1878.
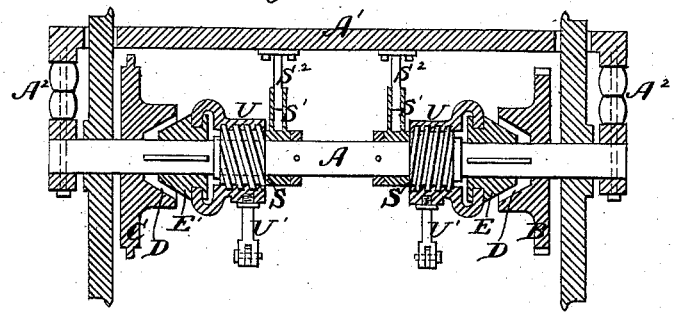
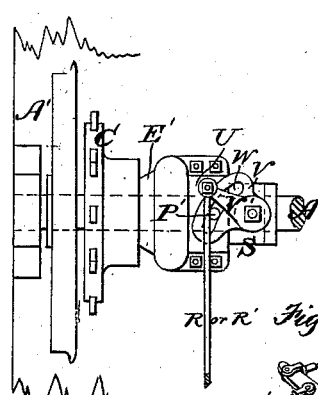
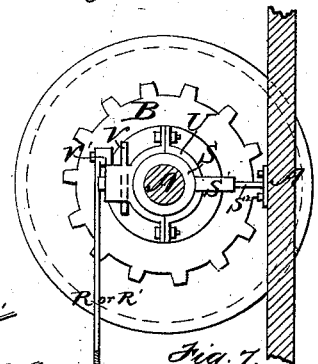
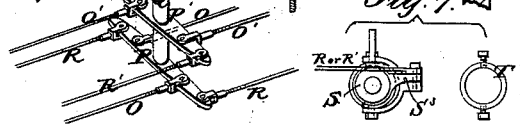
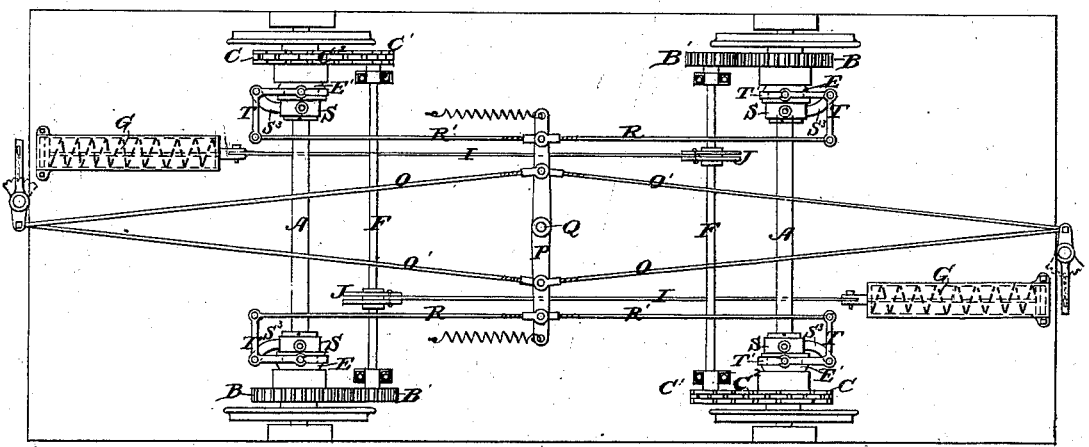
Witnesses
E. B. Fairchild
Geo. W. Pierce
Inventor
W. C. Thairlwall
by Wright & Brown
Attys.

UNITED STATES PATENT OFFICE.

WILLIAM C. THAIRLWALL, OF BOSTON, MASSACHUSETTS.

IMPROVEMENT IN CAR BRAKES AND STARTERS.

Specification forming part of Letters Patent No. 201,720, dated March 26, 1878; application filed February 2, 1878.

*To all whom it may concern:*

Be it known that I, WILLIAM C. THAIRLWALL, of Boston, in the county of Suffolk and State of Massachusetts, have invented certain Improvements in Car Brakes and Starters, of which the following is a specification:

This invention relates particularly to that class of combined car stopping and starting apparatus in which, when means are employed to stop the car, the momentum thereof is caused to act on a spring and accumulate power therein to be used in starting or assisting to start the car, the spring being connected to a secondary shaft which is adapted to be connected or geared at one end to an axle of the car in such manner that the rotation of the axle will cause the shaft to rotate in the opposite direction, and at the other end in such manner that the two will rotate in the same direction, these connections being made at separate times, the first named causing the secondary shaft to compress the spring while the car is stopping, and the last enabling the recoiling power of the spring to be applied to the axle through the secondary shaft in such manner as to assist in starting the car.

Heretofore in this class of stopping and starting apparatus the secondary shaft has been connected at both points through the instrumentality of a single sliding clutch on the axle, arranged to lock either of two loose gear-wheels to the axle, these wheels being suitably connected to the secondary shaft. This single clutch, however, can only lock one of the loose wheels at a time. Consequently, when one wheel has been locked, and the spring has been compressed by the resultant rotation of the secondary shaft, some auxiliary device must be employed to hold the secondary shaft, so as to retain the spring in its compressed condition while the clutch is being shifted to the other loose wheel, through which the recoiling power of the spring is to be imparted to the axle. Again, the single clutch does not enable both loose wheels to be locked to the axle at once, which is very desirable at times, as will appear hereinafter.

My invention has for its object to enable the spring to be held in its compressed condition by the same device which is used to cause the compression of the spring until the proper time for applying the recoiling power of the spring to the axle; also to enable both of the loose gears to be locked to the axle simultaneously, this operation, through the intervention of the secondary shaft, rendering the axle rigid, and enabling the car to be suddenly stopped.

The invention has for its object, finally, to produce a mechanical, practical, and easily-operated apparatus adapted to be applied to a street-car or other vehicle having a body supported by springs to stop or check the car and to start it wholly or in part after each stoppage.

To these ends my invention consists in the combination, with the spring, secondary shaft, and mechanism whereby said shaft is connected, as above described, to the car-axle, of two separate and independent clutches, arranged on the car-axle, and adapted to be operated separately and independently, as well as simultaneously, by the driver of the car, one clutch being first caused to connect the secondary shaft to the rotating axle at one end until the spring is compressed and the car stopped, and then caused to hold the spring in its compressed condition until the car is ready to start, the other clutch being caused to connect the secondary shaft at its other end to the stationary axle before the car starts, so that the recoiling power of the spring will be imparted to the axle to start the car through the latter clutch as soon as the former is released.

The invention also consists in the combination of the independent clutches with the secondary shaft and mechanism whereby the shaft is connected to the car-axle, when said clutches are operated simultaneously for the purpose of engaging the axle with the secondary shaft at both ends at once to stop the car suddenly.

The invention also consists in various details of construction and combinations of parts, all of which I will now proceed to describe and claim.

Of the accompanying drawings, forming a part of this specification, Figure 1 represents a longitudinal section of a car embodying my invention. Fig. 2 represents a bottom view of the same. Figs. 3, 4, and 5 represent detail views. Fig. 6, Sheet 2, represents a bottom view, showing a duplication of the arrangement shown in Fig. 2. Fig. 7 represents details of portions of the clutch-operating devices. Fig. 8 represents a transverse vertical section, showing a modification of the clutch-operating devices. Figs. 9 and 10 represent views of another modification of the clutch-operating devices, and Fig. 11 represents a perspective view of the pivoted levers and portions of the connecting-rods when the apparatus is constructed as shown in Fig. 6.

Similar letters refer to like parts in all the figures.

In the drawings, A A represent the axles of a street-car or other vehicle in which the axles revolve, and $A^1$ represents the body of the car supported on suitable springs $A^2$. B represents a spur-wheel, and C a chain-wheel, located on one or both of the axles A.

The wheels B C are loose on the axle when in their normal condition, (but are not movable lengthwise,) and they are adapted to be locked on the axle either independently or simultaneously.

To lock the wheels B C, I employ two separate and independent sliding brakes or friction-clutches, E E', which are located on one of the axles A, and are adapted both to slide on and revolve with the axle, the sliding of the clutches toward the wheels causing said clutches to enter conical sockets D formed in the sides of said wheels, which are thus locked on the axle and caused to revolve therewith.

The clutches may be positive, instead of frictional, if desired, and are operated either separately or simultaneously by the driver of the car through intermediate mechanism, which will be described.

F represents the secondary shaft, which is journaled in bearings attached to the body of the car, and is substantially parallel with the axle A. The shaft F is provided at one end with a spur-wheel, B', meshing with the spur-wheel B, and at the other end with a chain-wheel, $C^1$, which is connected by a chain, $C^2$, with the chain-wheel C. G represents the spring, which is preferably spiral in form, and is located in a box or casing, H, suitably attached to the bottom of the car. The spring G is connected, by a chain or cord, I, with a flanged drum, J, on the shaft F, the spring being preferably provided with a headed rod, J', bearing on a plate, K, which is supported on the outer end of the spring G, and is adapted to slide in the casing H. The cord or chain I is attached to the end of the rod J' and to the drum J, as shown in Fig. 1.

The sliding clutches E E' are operated by the driver of the car, and for this purpose I provide the car at each end with two crank-shafts, L L', provided at their upper ends with cranks and handles M M', placed within easy reach of the driver, and at their lower ends with cranks N N' below the bottom of the car. The latter cranks are connected by rods O O' with two horizontal levers, P P', which are pivoted centrally to a post, Q, depending from the bottom of the car, the levers P P' extending crosswise of the car, as shown. The lever P is connected indirectly with the clutch E by a rod, R, and the lever P' is connected indirectly with the clutch E' by a rod, R'.

The clutches E E' are connected to the rods R R' by devices whereby a longitudinal movement of the rods will cause the necessary movement of said clutches toward or away from the wheels B C. In connection with each clutch I employ a non-rotating sleeve, S, for supporting such connecting devices. This sleeve is located on the axle, and is connected to the body of the car by a tubular arm, $S^1$, rising from the sleeve, and a rod or bolt, $S^2$, attached to the bottom of the car and projecting down into the arm $S^1$, this connection holding the sleeve from rotating and moving endwise, and at the same time enabling the body of the car to move up and down on its springs independently of the axles.

The connecting devices supported by the sleeve S may consist of a bell-crank lever, T, pivoted to an arm, $S^3$, formed on the sleeve S, as shown in Figs. 6 and 7, one end of the lever being connected to the rod R and the other to a ring, T', fitted in a circumferential groove in the sliding clutch.

In Fig. 8 the sleeve S is shown as threaded externally and supporting an internally-threaded inclosing-sleeve, U, which is provided with an arm, U', connected to the rod R the sleeve U engaging with the groove in the clutch, as shown. In this case the sleeve U is partially rotated by the rod R, and caused by the screw-threads to move endwise of the axle with the clutch.

In Figs. 9 and 10 the construction is similar to that shown in Fig. 8, with the exception that the non-rotating sleeve S and the inclosing sliding sleeve U are not threaded, (the latter sliding freely on a feather in the former,) and that the sleeve is provided on its under side with a pivoted plate, V, in which is an eccentric slot, W, while the sliding sleeve U is provided with a pin, P', which projects into the slot W. The plate V is provided with an arm, V', which is connected to the rod R, by the longitudinal movement of which the plate V is turned on its pivot, the slot W acting on the pin P' and causing the sleeve U with its clutch to move along the axle.

I prefer to make the crank-shafts L' tubular and extend through them the shafts L, as shown in Fig. 1, either shaft being adapted to be rotated or turned independently of the other. A partial rotation of the crank-shaft L in one direction causes it through the described intermediate mechanism, to move the clutch E into connection with the wheel B, while a reverse movement of said crank-shaft will cause the separation of the clutch E from the wheel B.

In like manner is the clutch E' operated by the crank-shaft L', the duplication of the crank-shafts and connecting-rods O O' enabling the operation to be performed from either end of the car.

To hold the crank-shafts L L' positively, and, through said shafts and intermediate mechanism, the clutches E E' either in contact with or away from the wheels B C, I provide the cranks M M' with spring-bolts $a$ $a$, which are adapted to engage with a notched quadrant, $b$, supported rigidly on the fender of the car or otherwise, the bolts being provided with springs $c$, which draw them toward the quadrant, and with handles $d$, by means of which they may be drawn away from the quadrant, as shown in Fig. 3. The arrangement of the crank-shafts L L' one within the other enables them both to be used in connection with a single quadrant, their cranks M M' moving in concentric lines parallel with the quadrant.

$e$ represents a supplementary brake, which consists of a shoe located in one end of a frame, $e'$, which incloses one axle of the car, this brake being used when the wheels B C and accompanying devices are used in connection with the other axle, as shown in Figs. 1 and 2. The axle is preferably provided with a collar or enlargement, $f$, for the shoe $e$ to bear against. The frame $e'$ is pivoted at one end to a lever, $g$, which is pivoted at its upper end to the bottom of the car, and is connected at its lower end with the lever P by a rod, $h$, which is preferably made in two parts, as shown in Fig. 2, one part sliding in the other. A spiral spring, $i$, is interposed between the parts of the rod $h$ to give the brake $e$ a yielding pressure on the collar $f$.

Operation: Suppose the car to be running in the direction indicated by the arrow in Fig. 2. When the car is to be stopped in such manner as to compress the spring, the driver locks the wheel B to the axle by the clutch E, leaving the wheel C loose. The shaft F is thus caused to rotate in the direction indicated by the arrow in Fig. 4, and to compress the spring by winding the cord upon the drum until the car stops. The supplementary brake $e$ is applied to the other axle of the car at the same time that the clutch E is connected to the wheel B, the movement of the lever involved in operating the clutch E acting, through the rod $h$, to draw the brake $e$ against the collar $f$. The supplementary brake acts as an adjunct to the spring G in stopping the car, these two agencies being usually sufficient when it is not desirable to stop very suddenly. In fact, the spring alone can be made to effect the stoppage. The clutch E is kept in contact with the wheel B until it is desired to start the car, the spring being thus held in its compressed condition, its tendency now being to rotate the secondary shaft and the car-axle through the chain-wheels and chain in the direction indicated by the arrows in Fig. 1. As soon as the car stops the driver locks the wheel C to the axle by means of the clutch E', thus holding the car stationary; and when the signal to start is given the driver releases the wheel B, thus releasing the spring and enabling its recoiling power to be exerted on the axle through the locked chain-wheel C in such an increased form as to start the car in the direction in which it was previously moving. The spring is preferably made of such power that its force exerted on the axle, as described, will start the car independently of the horses.

When the car is to be stopped suddenly the clutches E E' are operated simultaneously to lock both the wheels B C, thus making the axle rigid through the intervention of the secondary shaft, the other axle being held at the same time by the supplementary brake, if the latter is employed. This operation causes a sudden stoppage of the car, and is only to be resorted to in extreme cases.

When the end of the line is reached, or when the car has to be backed after stopping, the chain-wheel C is locked first, and afterward the spur-wheel B. The recoiling power of the spring is then returned to the axle through the spur-wheels in the opposite direction to that in which the car was previously moving.

If desired, the chain-wheel D may be first locked to induce the compression of the spring, the spur-wheel being locked afterward to apply the recoiling power of the spring to the axle.

The gears or connected wheels on the axle and secondary shaft through which the power of the axle is imparted to compress the spring are preferably made of equal diameters, while the gears or connected wheels through which the recoiling power of the spring is applied to the axle are made of different diameters, the wheel of the secondary shaft being preferably one-third of the diameter of the wheel of the car-axle, so that the recoiling power of the spring will be given back to the axle in a sufficiently-increased form.

The clutches E E' are in all cases held positively by the spring-bolts of the crank-shafts L L' and the notched quadrants, so that when engaged with the loose wheels B C they cannot become disconnected therefrom, excepting by the act of the driver in releasing the crank-shafts.

The spring-bolts $a$ of the crank-shafts L L' at the rear end of the car are retracted and held out of connection with the quadrant by any suitable means, preferably by rings connecting their handles $d$ with the handles of the cranks M M', so as to prevent these spring-bolts from interfering with the working of the crank-shafts in use at the other end of the car. These rings are changed from end to end each time the driver shifts.

For light cars or vehicles I prefer to provide only one axle with the wheels B C; but for heavier cars the apparatus may be applied to both axles, as shown in Fig. 6.

The described apparatus is not affected in any way by the movement of the body of the car on its springs independently of the wheels, and is therefore well adapted to street-cars.

It is obvious that the parts described minus the spring constitute an effective brake or stopping apparatus with or without the supplementary brake e.

I claim as my invention—

1. In a car stopping and starting apparatus employing as elements a spur-wheel, B, and a chain-wheel, C, both adapted to revolve loosely on an axle of the car, a secondary shaft, F, connected, as described, to the wheels B C, and a spring, G, connected, as described, to the secondary shaft, the combination, with said elements, of the independent clutches E E', arranged on the car-axle, and mechanism, substantially as described, for operating and holding said clutches separately and independently, whereby one of the loose wheels B C is first locked to the rotating car-axle, and then held to retain the spring G in the compressed condition induced by the locking of said wheel until the other loose wheel is locked to the axle to impart thereto the recoiling-power of the spring, substantially as described.

2. In a car-stopping apparatus, the combination of the spur-wheel B and chain-wheel C, both adapted to revolve loosely on an axle of the car, and the secondary shaft F, connected, as described, to the wheels B C, with the independent clutches E E', arranged on the car-axle, and mechanism, substantially as described, for operating and holding said clutches simultaneously, whereby the car-axle is suddenly locked and prevented from rotating, substantially as described, for the purpose specified.

3. In a car brake or stopping apparatus, the combination of the axles A A, the wheels B C, loose upon one axle, the mechanism for locking the wheels B C to the axle, the secondary shaft F, and the supplementary brake e, all arranged and operating as set forth.

4. In a car stopping and starting apparatus, the combination of the axles A A, the loose wheels B C, mechanism for locking the wheels B C, the secondary shaft F, the spring G, and the supplementary brake e, all arranged and operating as set forth.

5. The clutch-operating mechanism, consisting of the crank-shafts L $L^1$, provided with locking devices, substantially as described, and the intermediate mechanism, whereby the crank-shafts are connected to the clutches E E', substantially as set forth.

6. The combination of a sliding clutch, a sleeve, S, supporting clutch-operating devices, substantially as described, located on the shaft or axle which carries the clutch, and devices, substantially as described, whereby the sleeve S is connected to a body or support adjacent to the shaft or axle in such manner as to be prevented from rotating or moving endwise without being affected by the independent vertical movement of said body or support, as set forth.

7. The sleeve S, having the tubular arm $S^1$, combined with the bolt or rod $S^2$ entering said tubular arm, and adapted to move up and down therein, substantially as and for the purpose specified.

In testimony whereof I have signed my name to this specification in the presence of two subscribing witnesses.

WILLIAM C. THAIRLWALL.

Witnesses:
C. F. BROWN,
GEO. W. PIERCE.